(12) United States Patent
Rekow

(10) Patent No.: US 8,190,364 B2
(45) Date of Patent: May 29, 2012

(54) SYSTEM AND METHOD FOR PROVIDING TOWED IMPLEMENT COMPENSATION

(75) Inventor: Andrew Karl Wihelm Rekow, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 428 days.

(21) Appl. No.: 12/478,975

(22) Filed: Jun. 5, 2009

(65) Prior Publication Data

US 2009/0326763 A1    Dec. 31, 2009

Related U.S. Application Data

(60) Provisional application No. 61/133,674, filed on Jun. 30, 2008.

(51) Int. Cl.
*G01C 21/00* (2006.01)

(52) U.S. Cl. ......... 701/466; 701/302; 701/412; 701/468

(58) Field of Classification Search .................. 701/50, 701/213, 214, 300, 302, 412, 417, 422, 466, 701/468

See application file for complete search history.

(56) References Cited

U.S. PATENT DOCUMENTS

| | | | |
|---|---|---|---|
| 6,128,574 A | 10/2000 | Diekhans | |
| 6,345,231 B2 | 2/2002 | Quincke | |
| 6,434,462 B1 | 8/2002 | Bevly et al. | |
| 6,865,465 B2 * | 3/2005 | McClure | 701/50 |
| 7,089,101 B2 * | 8/2006 | Fischer et al. | 701/41 |
| 7,110,881 B2 | 9/2006 | Gray et al. | |
| 7,162,348 B2 * | 1/2007 | McClure et al. | 701/50 |
| 7,437,230 B2 * | 10/2008 | McClure et al. | 701/50 |
| 7,509,199 B2 * | 3/2009 | Rekow | 701/50 |
| 7,580,783 B2 * | 8/2009 | Dix | 701/50 |
| 7,835,832 B2 * | 11/2010 | Macdonald et al. | 701/24 |
| 7,933,701 B2 * | 4/2011 | Davis et al. | 701/42 |
| 2002/0107627 A1 * | 8/2002 | Funke et al. | 701/70 |
| 2004/0186644 A1 * | 9/2004 | McClure et al. | 701/50 |
| 2005/0015189 A1 * | 1/2005 | Posselius et al. | 701/50 |
| 2005/0288834 A1 * | 12/2005 | Heiniger et al. | 701/23 |
| 2006/0142936 A1 | 6/2006 | Dix | |
| 2006/0237200 A1 | 10/2006 | Unruh et al. | |
| 2006/0282205 A1 * | 12/2006 | Lange | 701/50 |
| 2008/0004778 A1 | 1/2008 | Rekow | |
| 2008/0228353 A1 | 9/2008 | Mayfield et al. | |

OTHER PUBLICATIONS

Trimble Factsheet. AgGPS Truetracker Implement Steering System. [online] Retrieved from the Internet<URL: http://www.trimble.com/agriculture/truetracker.aspx?dtID=literature>.

Bevly, D M. High speed, dead reckoning and towed implement control for automatically steered farm tractors using GPS. Stanford University. Aug. 31, 2001. XP002618862. Retrieved from the Internet. <http://waas.stanford.ecu/~wwu/papers/gps/PDF/Thesis/DavidBevlyThesis01.pdf>.

* cited by examiner

*Primary Examiner* — Paul N Dickson
*Assistant Examiner* — Timothy Wilhelm

(57) ABSTRACT

A method for providing real-time, towed implement compensation comprises dynamically calculating an implement offset relative to a targeted track for an implement located at a first implement location. Based on the calculated implement offset, a vehicle offset is dynamically calculated relative to the targeted track for a vehicle located at a first vehicle location. The method further includes dynamically calculating a modified vehicle offset relative to the targeted track based on the calculated vehicle offset and based on a dynamically-calculated vehicle lateral error. The method further includes dynamically providing a steering control signal based on the calculated modified vehicle offset.

22 Claims, 5 Drawing Sheets

SYSTEM AND METHOD FOR PROVIDING TOWED IMPLEMENT COMPENSATION

This document claims priority based on U.S. provisional application Ser. No. 61/133,674, filed Jun. 30, 2008. under 35. U.S.C. 119(e).

FIELD OF THE INVENTION

The present invention relates to the field of satellite-based navigation/guidance systems, such as Global Positioning System (GPS)-based navigation systems, and particularly to a system and method for providing towed implement compensation.

BACKGROUND

Currently available satellite-based navigation systems may not provide a desired level of guidance accuracy. An implement may be towed, pushed, carried or otherwise propelled by a vehicle or propulsion unit. The implement path of the implement may deviate from a target path, particularly where the implement is towed by a vehicle or propulsion unit.

Therefore, it may be desirable to provide a system/method which addresses the above-referenced shortcomings of currently available solutions.

SUMMARY

One embodiment of a method and a computer program product for providing real-time, towed implement compensation, comprises: dynamically calculating an implement offset relative to a targeted track for an implement located at a first implement location; based on the calculated implement offset, dynamically calculating a vehicle offset relative to the targeted track for a vehicle located at a first vehicle location; dynamically calculating a modified vehicle offset relative to the targeted track based on the calculated vehicle offset and based on a dynamically-calculated vehicle lateral error; and dynamically providing a steering control signal based on the calculated modified vehicle offset.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

DETAILED DESCRIPTION OF EMBODIMENT(S)

Figure 1:
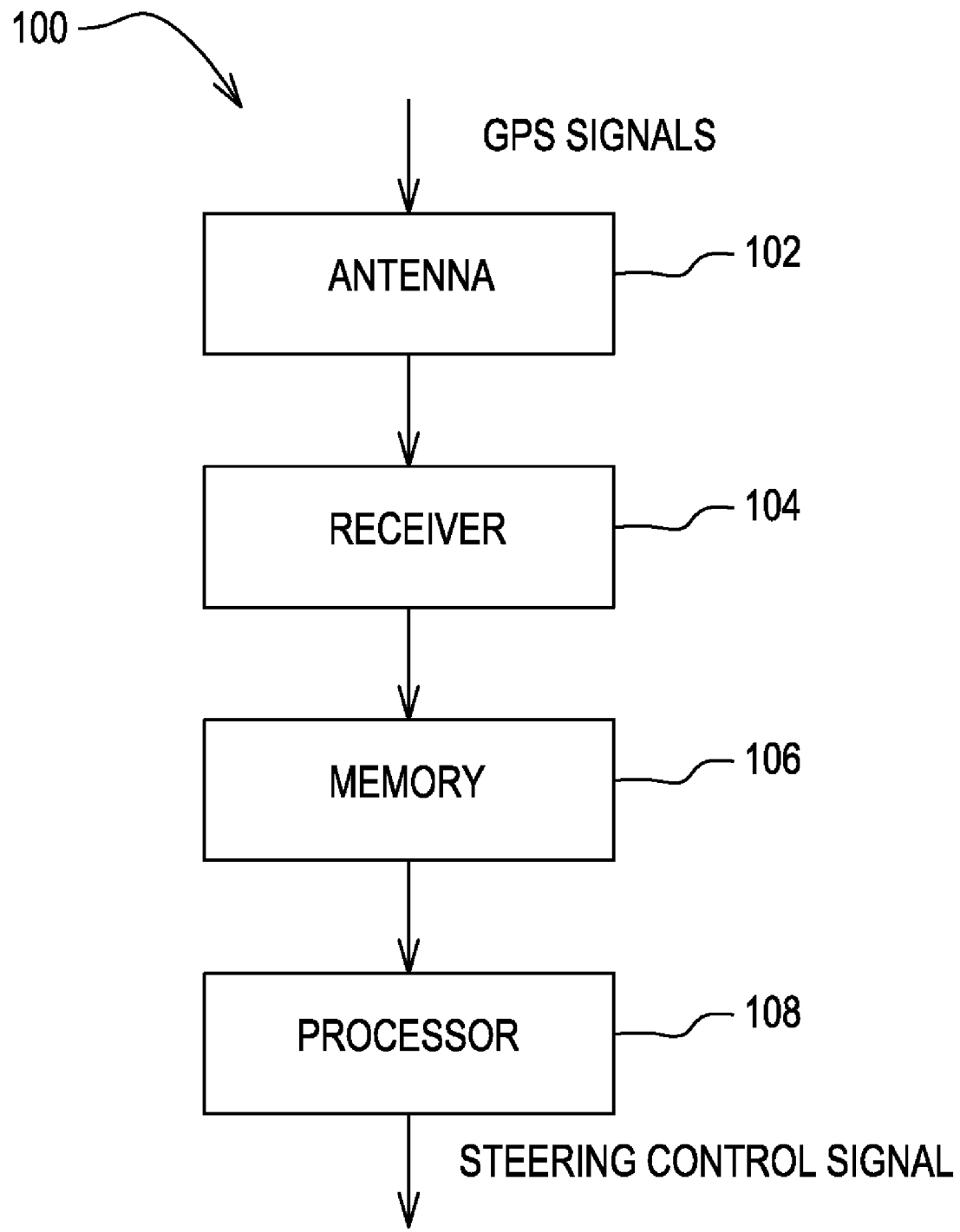
FIG. 1 is a block diagram illustration of a satellite-based navigation system configured for providing towed implement compensation in accordance with an exemplary embodiment.

Reference will now be made in detail to the presently preferred embodiments of the invention, examples of which are illustrated in the accompanying drawings.

Currently available satellite-based navigation systems, such as (GPS)-based navigation systems, may be implemented in vehicles, such as tractors. For the purposes of this application, a vehicle may be defined as any vehicle designed for towing, hauling, or pushing an implement (e.g., an agricultural implement), a trailer, agricultural/construction machinery, or the like. Such currently available satellite-based navigation systems may be/may be implemented with/may include a steering system/steering control system/automatic steering control, such as GreenStar™ AutoTrac Assisted Steering System, such as produced by Deere & Company. When an operator of a vehicle equipped with said AutoTrac System activates said AutoTrac System, the vehicle may attempt to immediately navigate onto/acquire a targeted track (e.g., a targeted implement track), row, pass, or path. For example, the vehicle may be guided along a first implement track of a field by the AutoTrac system. Upon reaching the end of the first implement track, the following series of steps may occur: 1) the operator may manually begin to steer/turn the vehicle around so as to begin to position the vehicle for navigation in the opposite direction along a second, or targeted implement track (e.g., which may be parallel to the first track); 2) the operator may then re-activate (such as via activation/manual manipulation of a button or switch) the AutoTrac system/functionality to allow the AutoTrac system to automatically assist in directing/steering/navigating the vehicle onto and along the targeted implement track (e.g., during automatic steering control resumption); and 3) once the AutoTrac system is re-activated (e.g., once automatic steering control resumption occurs), the vehicle may attempt to immediately acquire/navigate onto the targeted implement track. Automatic steering control resumption refers to a transition between an operator manually steering the vehicle and processor 108 generating a steering signal to steer or guide the vehicle based on position data (e.g., coordinates) from the location-determining receiver 104, or other sensor data. For example, automatic steering control resumption may occur upon or after manual activation/re-activation of a control by a user, such as via activation/re-activation of a resume switch of a CommandArm™ as produced by Deere and Company, which may allow the user to then let go of the wheel of the vehicle (e.g., tractor) and allow the AutoTrac system to navigate the vehicle. When the vehicle is pulling or towing an implement (e.g., a plow), the vehicle's attempt to immediately navigate onto the targeted implement track may be undesirable because the implement may not yet be in-line with the vehicle. For example, the vehicle may be able to be more quickly positioned onto the targeted implement track than the implement. The implement may require a significant distance/extra time coming out of the turn before it is able to swing back in directly behind or in-line with the vehicle and onto the targeted implement path. An experienced operator may try to manually account for this dilemma by navigating/positioning the vehicle during the turn, so that it overshoots (e.g., swings the vehicle wide of) the targeted implement track in such a way that the implement is able to more quickly acquire/navigate onto the targeted implement track during automatic steering control resumption coming out of the turn.

A number of control strategies may be employed by currently available satellite-based navigation systems implemented in vehicles for generating an optimal path a vehicle should navigate in order to direct the towed implement quickly onto a targeted implement track. For example, Linear Quadratic Control methods may be utilized for implicitly generating said optimal path by implementing a feedback control strategy. However, such Linear Quadratic Control methods may be computationally expensive. Other methods may pre-generate a required vehicle navigational path immediately upon automatic steering control resumption and may do a simple control strategy around said required vehicle navigational path. However, said pre-generating methods may also require a great deal of computation immediately upon resume/automatic steering control resumption.

A number of possible configurations may be implemented for a navigation system/satellite-based navigation system for use with a vehicle, such as a farm tractor, which is towing an implement. For example, a first configuration of a navigation system/satellite-based navigation system for use with a vehicle which is towing an implement may include a first location-determining receiver, such as a GPS receiver, which may be carried by/mounted on the vehicle (e.g., tractor), said first receiver configured for estimating a location of the vehicle (versus time). Further, said first configuration may include a data processor, said data processor configured for estimating a location of the implement based on one or more of: the vehicle location (versus time); characteristics of the implement (e.g., implement dimensions, implement length, implement width, implement wheelbase, hitch configuration, implement tire specifications, longitudinal distance between hitch and axis of rotation of implement wheels); ground characteristics (e.g., clay, sandy loam, moisture content); and implement motion model (e.g., motion equations).

Further, a second configuration of a navigation system/satellite-based navigation system for use with a vehicle which is towing an implement may include a first location-determining receiver, such as a GPS receiver, which may be carried by/mounted on the vehicle (e.g., tractor), and a second location-determining receiver, such as a GPS receiver, which may be carried by/mounted on the implement. The first location-determining receiver may provide location data for the vehicle or tractor (e.g., vehicular coordinates or vehicular position data) and the second location-determining receiver may provide implement location data (e.g., implement coordinates or implement location data). A third configuration of a navigation system/satellite-based navigation system for use with a vehicle which is towing an implement may include a first location-determining receiver (e.g., GPS receiver) which may be carried by/mounted on the vehicle, and a second location-determining receiver which may be carried by/mounted on the implement. The second location-determining receiver of the third configuration may be/may include a range finder (e.g., a laser transceiver) which may be configured for providing a distance and an angular bearing between a location of the vehicle and a location of the implement.

The system and method of the present invention may implement an algorithm for providing towed implement compensation, for instance, during automatic steering control resumption, which may promote quicker navigation of the towed implement onto the targeted implement track.

FIG. 1 illustrates a block diagram configuration for a satellite-based navigation system 100 in accordance with an exemplary embodiment of the present invention. For example, the satellite-based navigation system 100 may be a GPS (Global Positioning System) system. In further embodiments, the satellite-based navigation system 100 may be a DGPS (Differential Global Positioning System), a Galileo Positioning System, a Global Navigation Satellite System (GNSS), or the like. In the exemplary embodiment, the satellite-based navigation system 100 includes an antenna(s) 102 configured for collecting satellite-based navigation system signals. For instance, the antenna 102 may be a GPS antenna configured for collecting GPS signals. Further, the antenna 102 may be water-proof/water resistant and/or may include magnetic mounts for allowing the antenna to be secured to the top of the cab of a vehicle, such as a vehicle or applicator.

In the illustrated embodiment, the satellite-based navigation system 100 further includes a receiver 104 communicatively coupled with the antenna 102. The receiver 104 may be configured for receiving the collected satellite-based navigation system signals and, based on the collected signals, may be further configured for determining (e.g., dynamically determining/updating in real-time) current location information of/corresponding to a vehicle which is implementing the navigation system 100. The receiver 104 may be further configured, based on the collected signals, for determining (e.g., dynamically determining/updating in real-time) current location information of/corresponding to an implement (e.g., a plow) being towed by the vehicle. In current embodiments of the present invention, the receiver 104 may be a Differential Global Positioning System (DGPS) receiver. Further, the receiver 104 may be configured for receiving various types of signals, such as Wide-Area Augmentation Systems (WAAS) signals, Coast Guard signals, subscription L-band signals or a combination thereof. Still further, the type of signal received by the receiver 104 may be adjustably controlled by a user. In additional embodiments, the antenna 104 and the receiver 106 may be integrated into a single unit. Further, the receiver may be a StarFire iTC receiver, such as produced by Deere & Company.

In exemplary embodiments, the satellite-based navigation system 100 may further include a memory 106. The memory 106 may be communicatively coupled with the receiver 104 and may be configured for receiving the current vehicle location/current vehicle location information and the current implement location/current implement location information from the receiver 104. The memory 106 may be further configured for storing the current vehicle location/current vehicle location information and the current implement location/current implement location information. In further embodiments, the satellite navigation system 100 may be/may include/may be implemented with a Global Navigation Satellite System (GLONASS) which may be configured for providing alternative and/or complementary navigation data or position data.

In further embodiments, the satellite-based navigation system 100 may further include a processor 108. The processor 108 (e.g., a mobile processor) may be communicatively coupled with the memory 106 and may be configured for receiving the current vehicle location information and the current implement location information stored in the memory 106. The processor 108 may be further configured for determining a targeted implement track (e.g., a targeted navigation path for the vehicle and the implement to travel along, such as a row in a field). The targeted implement track may be a track which, if navigated along by the vehicle and the implement with the vehicle and implement being "in-line" (e.g., the implement trailing directly behind the vehicle in straight-line fashion), promotes efficient utilization of said vehicle and implement. For example, if the implement is a plow, a targeted implement track may be a track which prevents the implement from navigating across a previously plowed area of the field, such as track which is a generally straight-line path that is parallel to a previously traversed track(s)/previously plowed area(s). The targeted implement track may be determined based upon various parameters stored in and received from the memory 106, such as dimensions of the operating area (e.g., dimensions of the field, dimensions of the rows of the field, field attribute data) in which the vehicle/ vehicle is being utilized, the dimensions/location/direction of a previously navigated track (e.g., again, it may be desirable that targeted implement track runs parallel to a previously navigated track), dimensions of the vehicle, dimensions of the implement, dimensions of the vehicle-implement assembly (e.g., the implement is hooked up to the vehicle), locations/ dimensions of crops in the field/crop rows, current location information of the vehicle and/or the implement, current heading and speed of the vehicle/implement, or the like.

In exemplary embodiments, during automatic steering control resumption, the processor 108 may be further configured for calculating (e.g., dynamically calculating/updating/ re-calculating in real-time) an implement offset relative to the targeted implement track. For example, the implement offset may be a real-time estimate of a distance between the towed implement and the targeted implement track. Further, the implement offset may be calculated based on the vehicle location information, the implement location information, and the targeted implement track (e.g., targeted implement track location information, dimensions, etc.).

In further embodiments, the processor 108 may be configured for calculating (e.g., dynamically calculating/updating/ re-calculating in real time) a vehicle offset relative to the targeted implement track. The vehicle offset may be calculated based on the implement offset via an equation(s) or algorithm(s), such as $-1*$implement offset. For instance, as discussed above, when a vehicle pulling a plow navigates to the end of a first implement track (e.g., finishes plowing a first row of a field) via automatic steering control, the operator may have an area at the end of the field in which he manually steers the vehicle/turns the vehicle around so that the head of said vehicle is directed towards/onto a second or targeted implement track (e.g., a track which may be an unplowed, second row of the field which is parallel to the first row). The operator may then re-activate the automatic steering control (e.g., automatic steering control resumption) so that said steering control may navigate the vehicle and implement onto the targeted implement track. However, if the automatic steering control causes the vehicle to acquire the targeted implement track too quickly coming out of the turn, the implement may be offline relative to the targeted implement track, even though the vehicle is navigating accurately (e.g., in a straight line) along the targeted implement track. This may be because the implement may need additional time to angle into or fall into a straight-line position behind the vehicle coming out of the turn. In an exemplary embodiment, the dynamically-generated vehicle offset may be a real-time (e.g., at that given moment) estimate of a prescribed relative navigating distance to be maintained between the vehicle and the targeted implement track (e.g., the targeted implement track) for promoting guidance (e.g., via automatic steering control) of the implement towed by the vehicle onto the targeted implement track. The vehicle offset is calculated to account/compensate for the above-described implement angling (e.g., implement offset) coming out of the turn so that, after resuming automatic steering control, the vehicle and towed implement will be navigated onto the targeted implement track by the automatic steering control, via a path, angle and a speed, which will promote optimal acquisition of the targeted implement track by the vehicle and the towed implement.

The vehicle offset may be calculated based on the implement offset, current location information of the vehicle and the implement and/or the targeted implement track/targeted implement track information (e.g., location of the targeted implement track). Further, current location information of the vehicle and current location information of the implement may include/encompass current speed(s) of the vehicle and the implement, current angle(s) of travel of the vehicle and the implement (such as relative to targeted implement track(s)), current acceleration of the vehicle and the implement, current heading/direction of travel of the vehicle and the implement, physical dimensions (e.g., length, width) of the vehicle and implement, operating capacities/characteristics of the vehicle and implement, and/or the like.

In further embodiments, the processor 108 may be configured for dynamically generating a modified vehicle offset relative to the targeted implement track based on the vehicle offset and a generated (e.g., dynamically generated) vehicle lateral error used in steering control. For example, the vehicle offset may be added to the vehicle lateral error to provide the modified vehicle offset.

In additional embodiments, the system 100 is further configured for generating (e.g., dynamically generating) a steering control signal based on the dynamically-generated modified vehicle offset. For instance, the steering control signal may be received by/utilized by automatic steering control during automatic steering control resumption for guiding/ navigating the vehicle and towed implement onto the targeted implement path. The navigation system 100 of the present invention, by dynamically generating the modified vehicle offset relative to the targeted implement track and generating said steering control signal based on said dynamically-generated modified vehicle offset during automatic steering control resumption, allows the automatic steering control to compensate for the implement offset and to provide quicker guidance of a towed implement onto the targeted implement track via a computationally inexpensive method. As said targeted implement track is being acquired (e.g., by the vehicle and the implement), and the angle of the heading of the implement relative to the targeted implement track decreases (e.g., the system determines that the implement is heading towards the desired track), the vehicle offset may be gradually decayed/decremented/decreased during subsequent time samples, such as via the following equation/algorithm: Previous Vehicle Offset$*e^{\wedge}(-2*$distance traveled by implement/ implement length) and an updated modified vehicle offset may be generated based on said decremented vehicle offset and a dynamically-calculated updated vehicle lateral error. A subsequent steering control signal may be dynamically generated by the system 100 based on said updated modified vehicle offset.

In the exemplary embodiment, the guidance system 100 may further include a display 110 (not shown) which may be communicatively coupled with the processor 108 and may be configured for displaying satellite-based navigation system course information, such as a visual depiction or image of a current path of travel of a vehicle implementing the guidance system 100. The display 110 may be configured for receipt of user inputs.

Figure 2:
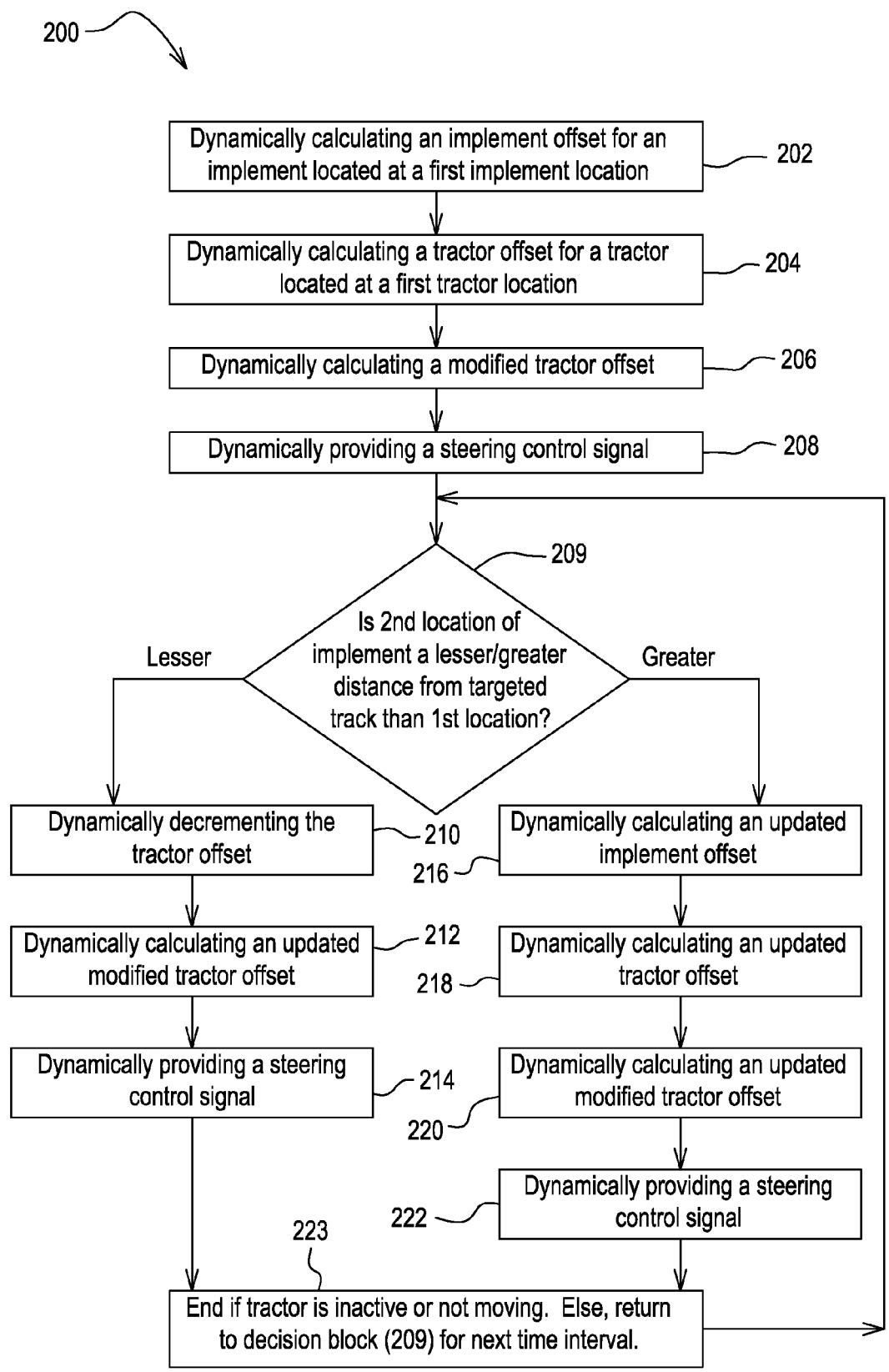
FIG. 2 is a flow chart illustrating a method for providing towed implement compensation in accordance with an exemplary embodiment.

FIG. 2 is a flow chart illustrating a method 200 for controlling or guiding a position of an implement to follow a targeted vehicle track, a targeted implement track or both. The method is well suited for providing real-time, towed implement compensation during automatic steering control resumption in accordance with an exemplary embodiment of the present invention. The method 200 begins in block 202.

In block 202, the processor 108 determines or dynamically calculates an implement offset (e.g., implement offset heading) relative to a targeted track for an implement located at a first implement location. The processor 108 may use data from a receiver 104, or an antenna 102 coupled to the receiver 104, on the vehicle or on the implement to estimate the first implement location. For example, a first antenna 102 may be mounted on the vehicle (e.g., tractor) and selectively coupled to the receiver 104 (via a radio frequency or microwave switch) for estimating the vehicle location, whereas the second antenna is mounted on the implement and selectively coupled (via a radio frequency or microwave switch) to the receiver 104 for estimating the implement location. The targeted track (e.g., generally linear path or preestablished turn pattern) for the implement may be stored in the memory 106 by an operator of the vehicle or preprogrammed at a factory or by a technician.

In block 204, based on the calculated implement offset (e.g., implement offset heading), the processor 108 determines or dynamically calculates a vehicle offset (e.g., tractor offset for a tractor) relative to the targeted track for a vehicle located at a first vehicle location (e.g., a first tractor location). The targeted track (e.g. generally linear path or preestablished turn pattern) for the vehicle may be stored in the memory 106 by an operator of the vehicle or preprogrammed at a factory or by a technician.

In block 206, the processor 108 determines or dynamically calculates a modified vehicle offset (e.g. modified tractor offset or modified vehicle offset heading) relative to the targeted track based on the calculated vehicle offset (e.g., calculated tractor offset) and based on a dynamically-calculated vehicle lateral error. The lateral error represents a shortest distance between the targeted track of the vehicle and the actual position of the vehicle (or the first vehicle location).

In block 208, the processor 108 determines or dynamically provides a steering control signal or control data to a steering controller or steering system of the vehicle based on the calculated modified vehicle offset (e.g., modified vehicle offset heading). In alternate embodiments, the implement may have active steering or an ancillary steering controller for steering or adjusting the position of the implement in response to the control signal or control data provided by the processor 108.

In decision block 209, after some time has elapsed since carrying out block 202 or after the vehicle has implement has been moved from the first implement location, the processor 108 determines whether the implement is located at a second implement location that is a lesser distance or a greater distance from the targeted track than the first implement location. If the implement is located at a lesser distance, the method 200 continues with step block 210. However, if the implement is located at a greater distance, the method 200 continues with block 216.

In block 210, the processor 108 decreases or dynamically decrements the vehicle offset (e.g., tractor offset or vehicle offset heading). Accordingly, the vehicle offset of the vehicle (e.g., tractor), which may be expressed as a vehicle offset heading angle, is reduced or decreased with respect to the targeted vehicle track.

After executing block 210, in block 212, the processor 108 may determine or dynamically calculate an updated modified vehicle offset (e.g., an updated modified tractor offset or updated modified vehicle offset heading) relative to the targeted track based on the decremented vehicle offset and a dynamically-calculated updated vehicle lateral error.

In block 214, the processor 108 may determine a steering control signal or data, or further include dynamically providing a steering control signal based on the updated modified vehicle offset (e.g., updated modified vehicle offset heading).

Alternatively, when the implement is located at a second implement location that is a greater distance from the targeted track than the first implement location, the method 200 continues with block 216 after decision block 209.

In block 216, the processor 108 determines or dynamically calculates an updated implement offset (e.g., an updated implement offset heading) relative to the targeted track.

In block 218, based on the updated implement offset (e.g., updated implement offset heading), the processor 108 determines or dynamically calculates an updated vehicle offset relative to the targeted track 218. For example, the processor 108 may determine that the updated tractor offset, which may be expressed as the vehicle offset heading angle, may be greater or increased with respect to the targeted vehicle track to compensate for the greater distance found in block 209.

In block 220, the processor 108 determines or dynamically calculates an updated modified vehicle offset (e.g., updated modified vehicle offset heading) relative to the targeted track based on the updated vehicle offset and based on a dynamically-calculated updated vehicle lateral error.

In block 222, the processor 108 may further include dynamically providing a steering control signal or steering control data based on the updated modified vehicle offset (e.g., updated modified vehicle offset heading).

Block 223 is executed after block 214 or block 212. In block 223, the processor 108 ends the process or stops the execution of one or more loops or sequences (of FIG. 2) if the vehicle is inactive or not moving. Otherwise, the processor 108 returns the process to decision block (209) for next time interval and the execution of one of the two alternative loops or sequences resulting from the decision block. The receiver 194 may provide vehicle motion data, acceleration data, position data versus time data, or the like to the processor 104 for determining whether or not the vehicle is inactive, active, moving, or not moving for block 223.

Figure 3:
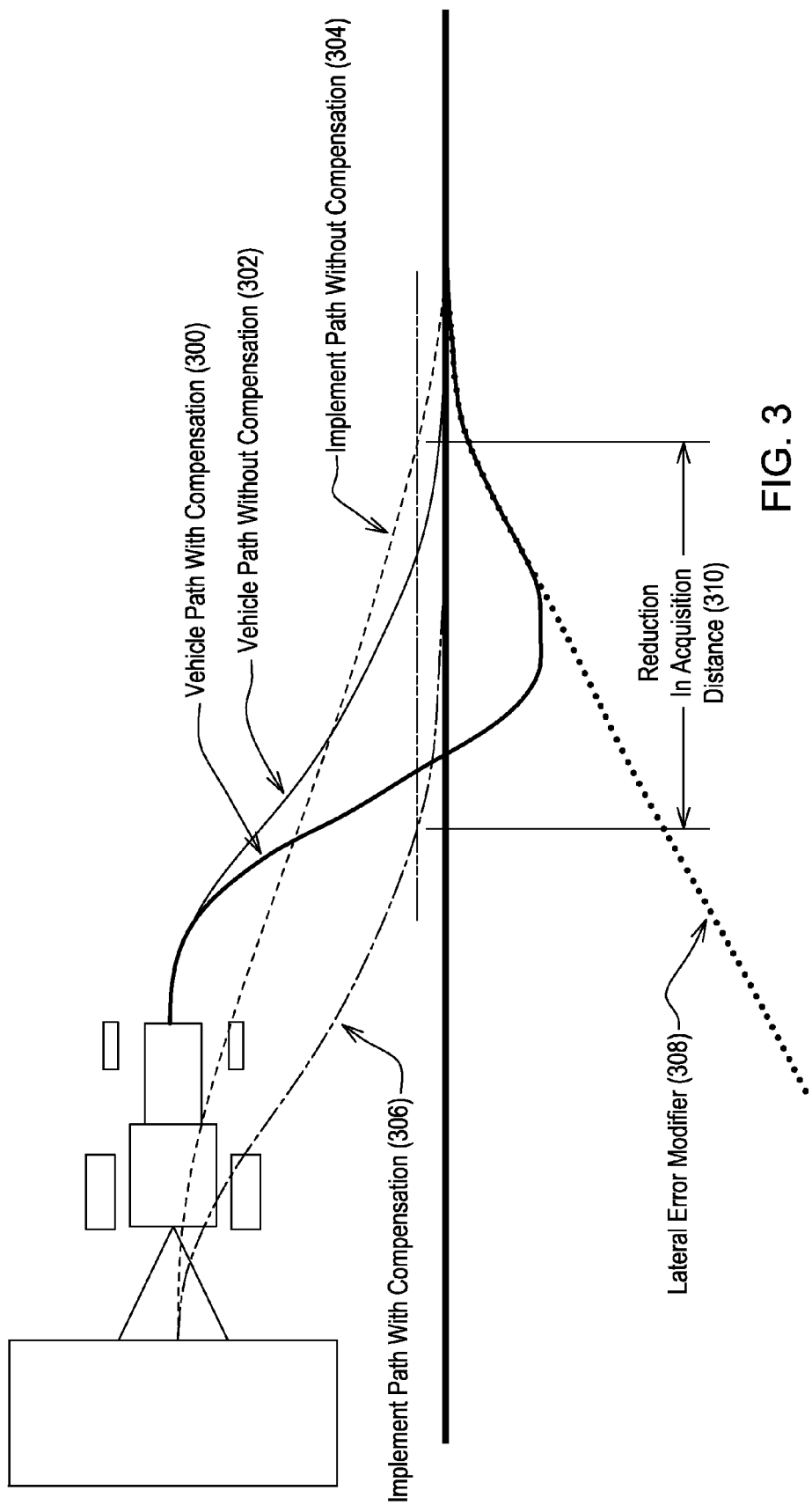
FIG. 3 is a track schematic illustrating the effects of towed implement compensation provided by the system/method.

FIG. 3 is a track schematic illustrating the relative path/navigational effects of towed implement compensation provided by the system/method of the present invention versus when towed implement compensation is not provided.

FIG. 3 illustrates shows the results of a model that predict the vehicle path (e.g., tractor path) without compensation and the corresponding implement path without compensation. The vehicle path without compensation (302) is indicated by a thinner curved line segment, whereas the implement path without compensation (304) is indicated by a curved dashed line segment. The vehicle path (e.g., tractor path) with compensation (300) is shown as a bold solid curved line. The vehicle path with compensation (300) has a compensating turn or path compensation, which approaches an orthogonal angle to the initial direction of travel of the vehicle, to more quickly bring the implement in line (over a reduction in acquisition distance (310)) with the initial direction of travel along an implement path with compensation (306), shown as a curved line with alternating short and long dashes.

In accordance with one illustrative example the compensation illustrated in FIG. 3, any vehicle position (or vehicle path) and the corresponding implement position (or implement path) of the implement may be defined in accordance with a model of implement position as a function of vehicle movement and position. In the model, one or more equations may be used to define the movement and the position of the vehicle and the implement, where the vehicle path (e.g., tractor path) without compensation is known and where each equation for the vehicle is valid within a certain range of starting and termination points that represent the position of the vehicle. In one illustrative example, the equation that defines the implement path with or without compensation depends on vehicle and implement characteristics, such as the hitch arrangement (e.g., three point hitch) between the vehicle and the implement and the distance between the pivot point associated with the hitch and the center of the wheelbase of the implement wheels (e.g., for an implement with two wheels). In accordance with the model, factors such as the terrain slope, ground moisture, soil composition of the ground, the weight of the implement, the geometry of tires, and the configuration ground-contacting members of the implement may effect the slippage or sideways movement of the implement that cause some deviation from following the path of the vehicle that is pulling or towing the implement in accordance with the path that is otherwise predicted by the distance between the pivot point and the center of the wheelbase of the implement wheels.

The equation may be used to estimate the implement position based on the vehicle position, which is determined by control inputs as the vehicle moves or tracks a targeted vehicle track. The equation supports determining the implement position in the absence of the second location-determining receiver 422 on the implement.

Figure 4:
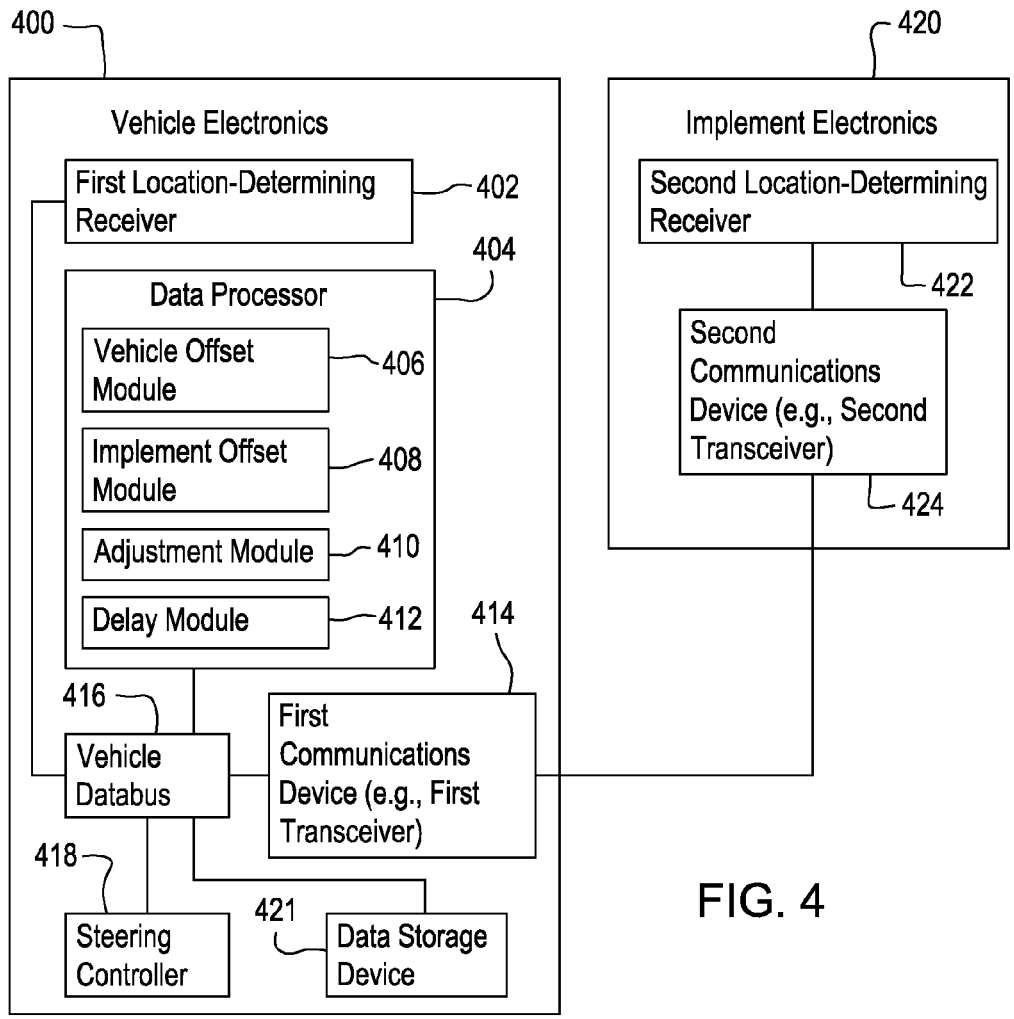
FIG. 4 is a block diagram of one embodiment of a system for providing for towed implement compensation.

FIG. 4 illustrates one embodiment of a system for controlling an implement or towed implement. The system comprises vehicle electronics 400 that communicate with implement electronics 420. The vehicle electronics 400 are mounted on or carried by the vehicle, whereas the implement electronics 420 are mounted on or carried by the implement. The vehicle electronics 400 comprises a first location-determining receiver 402, a data processor 404, a first communications device 414, a data storage device 421 and a steering controller 418 that are coupled to a vehicle data bus 416. The data processor 404 is capable of communicating with one or more of the following via the vehicle data bus 416: a first location-determining receiver 402, a data processor 404, a first communications device 414, a data storage device 421 and a steering controller 418 that are coupled to a vehicle data bus 416.

The data processor 404 may comprise a microprocessor, a microcontroller, an application specific integrated circuit, a programmable logic array, a logic circuit, or another device for processing data. The data processor 404 may comprise modules, where each module comprises software, hardware or both. As shown in FIG. 4, the data processor 404 comprises a vehicle offset module 406, an implement offset module 408, an adjustment module 410, and a delay module 412.

The implement electronics 420 comprises a second location-determining receiver 422 coupled to a second communications device 424. The first communications device 414 may comprise a first transceiver, a wireless transceiver, a wireline transceiver, an input/output port, or the like. The second communications device 424 may comprise a second transceiver, a wireless transceiver, a wireline transceiver, an input/output port or the like. Although the first communications device 414 is coupled to the second communications device 424 via a transmission line (e.g., cable, coaxial cable, or wire) as shown in FIG. 4, in an alternate embodiment the transmission line may be deleted where the first communications device 414 and the second communications device 424 communicate wirelessly via an electromagnetic signal.

The first location-determining receiver 402 may comprise a Global Positioning System (GPS) receiver with or without differential correction (e.g., a separate receiver for receiving position correction information). Similarly, the second location-determining receiver 422 may comprise a Global Positioning System (GPS) receiver with or without differential correction. The first location determining receiver provides one or more of the following data: location data, heading data, vehicle offset heading 508, lateral error 506, and velocity data for the vehicle. The second location determining receiver provides one or more of the following data: location data, heading data, implement offset heading 510, lateral error 506, and velocity data for the implement.

The data storage device 421 may comprise any magnetic, optical, disk drive, electronic memory, nonvolatile electronic memory or other storage media capable of storing digital data.

The steering controller 418 receives control data or a control signal from the data processor 404. The steering controller 418 controls, turns or steers one or more steerable wheels of the vehicle in response to a control signal, control data or other output of the data processor 404. The steering controller 418 may comprise a controller for sending a signal to an electro-hydraulic valve, a solenoid, or an electro-mechanically controlled device for controlling a hydraulic steering system. In an alterative embodiment, the steering controller 418 may comprise a controller for sending an electrical signal to an electric motor for an electrical steering system.

In the data processor 404, the vehicle offset module 406 determines a vehicle offset of the vehicle. For example, the vehicle offset module 406 determines a vehicle offset as the shortest distance between a reference point on the vehicle and a target vehicle track.

Figure 5:
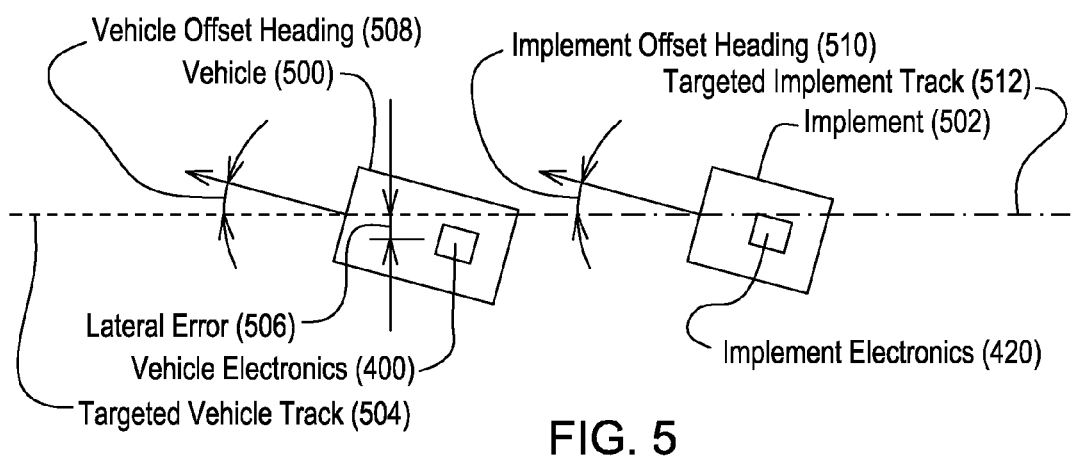
FIG. 5 is a block diagram of a plan view of a vehicle and an implement, consistent with FIG. 4.

FIG. 5 shows a vehicle 500 equipped with vehicle electronics 400 and an implement 502 equipped with implement electronics 420. The vehicle 500 is arranged to pull or tow the implement 502, such that the implement 502 follows the path of the vehicle 500 to a certain extent. The implement 502 may be coupled to the vehicle 500 via a hitch or another connection device.

In FIG. 5, the vehicle 500 follows a targeted vehicle track 504 indicated by a dashed line segment with larger dashes, whereas the implement 502 follows a targeted implement track 512 indicated by a dashed line segment with smaller dashes. In one example, where the vehicle 500 is traveling in a generally straight line or along a rectilinear path, the targeted implemented track may be identical or substantially similar to the targeted implement track 512. In another example, where the vehicle 500 turns, the targeted implement track 512 may deviate somewhat form the targeted vehicle track 504.

The vehicle position relative to the targeted vehicle track 504 may be defined by reference to a vehicle offset heading 508 and a lateral error 506. The vehicle offset heading 508 comprises a vehicle angle between the vehicle heading and the targeted vehicle track 504. The lateral error 506 comprises a shortest distance from a reference point on the vehicle to the targeted vehicle track 504. The implement offset heading 510 comprises an implement angle between an implement heading and the targeted implement track 512. The vehicle electronics 400 may control its vehicle offset heading 508 and its lateral error 506 to improve tracking of the targeted vehicle track 504 by the vehicle and the targeted implement track 512 by the implement, for example.

FIG. 5 is presented for illustrative purposes. Although the vehicle offset heading 508 and the implement offset heading 510 appear to be independent from each other as shown in FIG. 5, in practice the hitch or drawbar (not shown) that interconnects the vehicle and implement would tend to cause the implement to point toward the vehicle.

Figure 6:
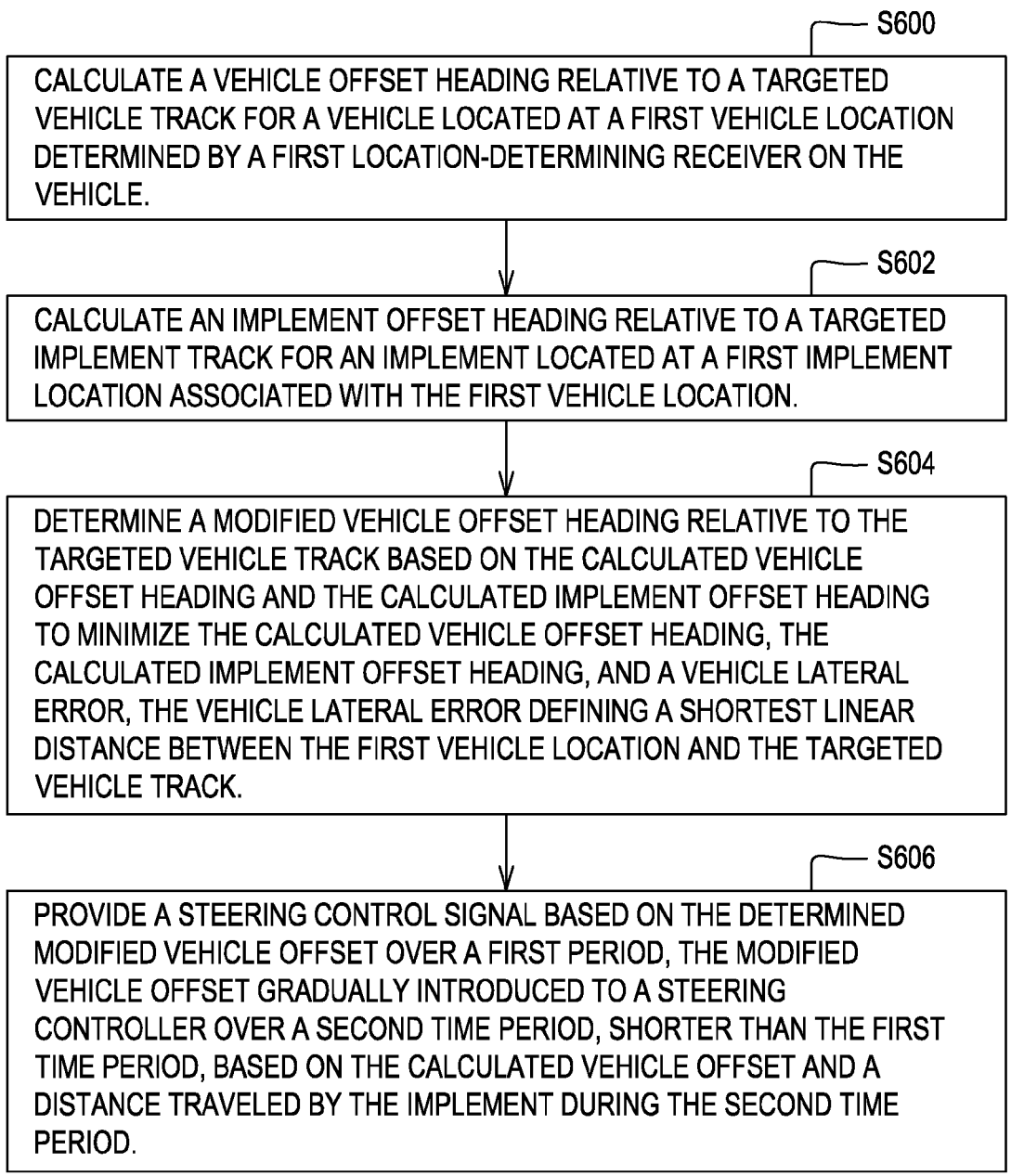
FIG. 6 is a flow chart of a method for controlling an implement in accordance with one embodiment.

FIG. 6 illustrates a method for controlling an implement or a method for providing real-time, towed implement compensation. The method of FIG. 6 begins with step S600.

In step S600, the data processor 404 or the vehicle offset module 406 calculates or determines a vehicle offset heading

508 relative to a targeted vehicle track 504 for a vehicle 500 located at a first vehicle location determined by a first location-determining receiver 402 on the vehicle 500.

In step S602, the data processor 404 or the implement offset module 408 calculates or determines an implement offset heading 510 relative to a targeted implement track 512 for an implement 502 located at a first implement location associated with the first vehicle location. Step S602 may be carried out by various techniques that may be applied alternately or cumulatively. Under a first technique, the data processor 404 or implement offset module 408 calculates the implement offset heading 510 by estimating the first implement location based on a the first vehicle location and a model of implement position as a function of vehicle movement and position. Under a second technique, the data processor 404 or implement offset module 408 calculates the implement offset heading 510 by estimating the first implement location based on a second location determining receiver on the implement. Under a third technique, the data processor 404 or implement offset module 408 determines the implement offset heading 510 by estimating a first implement location based on a first location determining receiver 402 that is coupled to an antenna mounted on the implement 400, via a radio frequency switch or microwave switch. Accordingly, under the third technique, the second location-determining receiver 420 is replaced by a switch at the vehicle electronics 400 and an implement mounted antenna associated with the implement or the implement electronics 420. The switch selectively couples an implement-mounted antenna to the first location-determining receiver 402 for determining an implement position and implement heading, and selectively couples a vehicle mounted antenna to the first location-determining receiver 402 for determining a vehicle position and vehicle heading, where the data processor 404 may compensate with motion equations (e.g., relative position, heading and velocity of the implement and the vehicle) for determining implement position and vehicle position at slightly different or non-simultaneous sample times.

In step S604, the data processor 404 or the implement offset module 408 determines a modified vehicle offset heading 508 relative to the targeted vehicle track 504 based on the calculated vehicle offset heading 508 and the calculated implement offset heading 510 to minimize the calculated vehicle offset heading 508, the calculated implement offset heading 510, and a vehicle lateral error 506, the vehicle lateral error 506 defining a shortest linear distance between the first vehicle location and the targeted vehicle track 504.

In step S606, the data processor 404 or adjustment module 410 provides a steering control signal based on the determined modified vehicle offset over a first time period. The data processor 404 or adjustment module 410 controls a delay module 412 such that the modified vehicle offset gradually introduced to a steering controller 418 over a second time period. The second time period is shorter than the first time period. The modified vehicle offset is based on the calculated vehicle offset and a distance traveled by the implement during the second time period. Step S606 may be carried out by the data processor 404 or adjustment module 410 providing the steering control signal by gradually decreasing or decaying the modified vehicle offset heading 508 in accordance with the following equation:

$$O_N = O_{P_e}^{(-2d/1)}$$

where $O_N$ is the modified vehicle offset heading 508, $O_P$ is the previous vehicle offset or the calculated vehicle offset heading 508, "e" is the exponential function, "d" is the distance traveled by the implement during the second time period, and "1" is the length of the implement.

It is contemplated that the invention may take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

It is further contemplated that the medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one receiver coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, microphone, speakers, displays, pointing devices, and the like) may be coupled to the system either directly or through intervening I/O controllers.

Network adapters may also be coupled to the system to enable the data processing system to become coupled to other data processing systems or storage devices through intervening private or public networks. Modems, cable modem and Ethernet cards are just a few of the currently available types of network adapters.

A further embodiment of the present invention is directed to a computer program product, including: a computer useable medium including computer usable program code for performing a method for providing real-time, towed implement compensation, such as during automatic steering control resumption, for a vehicle implementing a satellite-based navigation system including: computer usable program code for dynamically calculating an implement offset relative to a targeted track for an implement located at a first implement location; computer usable program code for, based on the calculated implement offset, dynamically calculating a vehicle offset relative to the targeted track for a vehicle located at a first vehicle location; computer usable program code for dynamically calculating a modified vehicle offset relative to the targeted track based on the calculated vehicle offset and based on a dynamically-calculated vehicle lateral error; and computer usable program code for dynamically providing a steering control signal based on the calculated modified vehicle offset.

An additional embodiment of the present invention is directed to a satellite-based navigation system, including: an antenna configured for collecting satellite-based navigation system signals; a receiver communicatively coupled with the antenna, the receiver configured for receiving the signals collected by the antenna, the receiver further configured for dynamically determining current location information corresponding to a vehicle implementing the navigation system based on said received signals, the receiver further configured for dynamically determining current location information corresponding to an implement being towed by the vehicle based on said received signals; a memory communicatively coupled with the receiver, the memory configured for receiving the vehicle location information and the implement location information from the receiver, said memory further configured for storing said vehicle location information and said implement location information; and a processor communicatively coupled with the memory and configured for receiving the vehicle location information and the implement location information stored in the memory, the processor further configured for determining a targeted implement track for the vehicle and the implement, the processor further configured for calculating an implement offset relative to the targeted implement track, the processor further configured, based on the implement offset, for dynamically calculating a vehicle offset relative to the targeted implement track, wherein the implement offset is calculated based on the vehicle location information, the implement location information, and the targeted implement track.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages is to be understood by the foregoing description, and it is apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing real-time, towed implement compensation, comprising:
   calculating a vehicle offset heading relative to a targeted vehicle track for a vehicle located at a first vehicle location determined by a first location-determining receiver on the vehicle;
   calculating an implement offset heading relative to a targeted implement track for an implement located at a first implement location associated with the first vehicle location;
   determining a modified vehicle offset heading relative to the targeted vehicle track based on the calculated vehicle offset heading and the calculated implement offset heading to minimize the calculated vehicle offset heading, the calculated implement offset heading, and a vehicle lateral error, the vehicle lateral error defining a shortest linear distance between the first vehicle location and the targeted vehicle track; and
   providing a steering control signal based on the determined modified vehicle offset over a first time period, the modified vehicle offset gradually introduced to a steering controller over a second time period, shorter than the first time period, based on the calculated vehicle offset and a distance traveled by the implement during the second time period, wherein the providing of the steering control signal further comprises gradually decreasing or decaying the modified vehicle offset heading in accordance with the following equation:

$$O_N = O_{P_e}^{(-2d/l)}$$

where $O_N$ is the modified vehicle offset headin $O_p$ is the previous vehicle offset or the calculated vehicle offset heading, e is the exponential function, d is the distance traveled by the implement during the second time period, and l is the length of the implement.

2. The method according to claim 1 wherein the calculating of the implement offset heading further comprises estimating the first implement location based on a the first vehicle location and a model of implement position as a function of vehicle movement and position.

3. The method according to claim 1 wherein the calculating of the implement offset heading further comprises estimating the first implement location based on a second location determining receiver on the implement.

4. The method according to claim 1 wherein the calculating of the implement offset heading further comprises estimating the first implement location based on the first location determining receiver that is selectively coupled to a first antenna on the vehicle or a second antenna on the implement.

5. The method as claimed in claim 1, further comprising:
   if the implement is located at a second implement location, and the second implement location is a lesser distance from the targeted track than the first implement location, decreasing or decrementing the vehicle offset heading.

6. The method as claimed in claim 5, further comprising:
   dynamically calculating an updated modified vehicle offset heading relative to the targeted track based on the decremented vehicle offset heading and based on a dynamically-calculated updated vehicle lateral error.

7. The method as claimed in claim 6, further comprising:
   dynamically providing a steering control signal based on the updated modified vehicle offset heading.

8. A method as claimed in claim 7, further comprising:
   based on the updated implement offset heading, dynamically calculating an updated vehicle offset heading relative to the targeted track.

9. The method as claimed in claim 1, further comprising:
   if the implement is located at a second implement location, and the second implement location is a greater distance from the targeted track than the first implement location, dynamically calculating an updated implement offset heading relative to the targeted track.

10. A method as claimed in claim 9, further comprising:
    dynamically calculating an updated modified vehicle offset heading relative to the targeted track based on the updated vehicle offset heading and based on a dynamically-calculated updated vehicle lateral error.

11. A method as claimed in claim 10, further comprising:
    dynamically providing a steering control signal based on the updated modified vehicle offset heading.

12. A method as claimed in claim 10, wherein said towed implement compensation is provided during automatic steering control resumption.

13. A computer program product, comprising:
    a computer useable medium including computer usable program code for performing a method for providing real-time, towed implement compensation for a vehicle implementing a satellite-based navigation system comprising:
  computer usable program code for dynamically calculating an implement offset relative to a targeted track for an implement located at a first implement location;
  computer usable program code for, based on the calculated implement offset, dynamically calculating a vehicle offset relative to the targeted track for a vehicle located at a first vehicle location;
  computer usable program code for dynamically calculating a modified vehicle offset relative to the targeted track based on the calculated vehicle offset and based on a dynamically-calculated vehicle lateral error; and
  computer usable program code for dynamically providing a steering control signal based on the calculated modified vehicle offset, wherein the providing of the steering control signal further comprises gradually decreasing or decaying the modified vehicle offset heading in accordance with the following equation:

$$O_N = O_{P_e}^{(-2d/l)}$$

where $O_N$ is the modified vehicle offset headin $O_p$ is the previous vehicle offset or the calculated vehicle offset heading, e is the exponential function, d is the distance traveled by the implement during the second time period, and l is the length of the implement.

14. The computer program product as claimed in claim 13, further comprising:
  computer usable program code for, when the implement is located at a second implement location, and the second implement location is a lesser distance from the targeted track than the first implement location, dynamically decrementing the vehicle offset.

15. The computer program product as claimed in claim 13, further comprising:
  computer usable program code for dynamically calculating an updated modified vehicle offset relative to the targeted track based on the decremented vehicle offset and based on a dynamically-calculated updated vehicle lateral error.

16. The computer program product as claimed in claim 15, further comprising:
  computer usable program code for dynamically providing a steering control signal based on the updated modified vehicle offset.

17. The computer program product as claimed in claim 13, further comprising:
  computer usable program code for, when the implement is located at a second implement location, and the second implement location is a greater distance from the targeted track than the first implement location, dynamically calculating an updated implement offset relative to the targeted track.

18. The computer program product as claimed in claim 13, further comprising:
  computer usable program code for, based on the updated implement offset, dynamically calculating an updated vehicle offset relative to the targeted track.

19. The computer program product as claimed in claim 18, further comprising:
  computer usable program code for dynamically calculating an updated modified vehicle offset relative to the targeted track based on the updated vehicle offset and based on a dynamically-calculated updated vehicle lateral error.

20. The computer program product as claimed in claim 18, further comprising:
  computer usable program code for dynamically providing a steering control signal based on the updated modified vehicle offset.

21. The computer program product as claimed in claim 13, wherein said towed implement compensation is provided during automatic steering control resumption.

22. A method for providing real-time, towed implement compensation, comprising:
  calculating a vehicle offset heading relative to a targeted vehicle track for a vehicle located at a first vehicle location determined by a first location-determining receiver on the vehicle;
  calculating an implement offset heading relative to a targeted implement track for an implement located at a first implement location associated with the first vehicle location;
  determining a modified vehicle offset heading relative to the targeted vehicle track based on the calculated vehicle offset heading and the calculated implement offset heading to minimize the calculated vehicle offset heading, the calculated implement offset heading, and a vehicle lateral error, the vehicle lateral error defining a shortest linear distance between the first vehicle location and the targeted vehicle track; and
  providing a steering control signal based on the determined modified vehicle offset over a first time period, the modified vehicle offset gradually introduced to a steering controller over a second time period, shorter than the first time period, based on an exponentially decreasing function of the calculated vehicle offset and a distance traveled by the implement during the second time period.

* * * * *

UNITED STATES PATENT AND TRADEMARK OFFICE
CERTIFICATE OF CORRECTION

| | | |
|---|---|---|
| PATENT NO. | : 8,190,364 B2 | |
| APPLICATION NO. | : 12/478975 | |
| DATED | : May 29, 2012 | |
| INVENTOR(S) | : Andrew Karl Wilhelm Rekow | |

It is certified that error appears in the above-identified patent and that said Letters Patent is hereby corrected as shown below:

Title page item (75) Inventor Andrew Karl Wihelm Rekow should be listed as Andrew Karl Wilhelm Rekow.

Signed and Sealed this
Seventh Day of August, 2012

David J. Kappos
*Director of the United States Patent and Trademark Office*